United States Patent [19]
Lakoski

[11] Patent Number: 5,995,082
[45] Date of Patent: *Nov. 30, 1999

[54] REMOVABLE PAD FOR PORTABLE COMPUTER

[76] Inventor: Robert P. Lakoski, 5417 Shoalwood Ave., Austin, Tex. 78756

[ * ] Notice: This patent is subject to a terminal disclaimer.

[21] Appl. No.: 08/340,179

[22] Filed: Nov. 15, 1994

[51] Int. Cl.[6] .................................................. G09G 5/00
[52] U.S. Cl. ........................ 345/168; 345/163; 248/918
[58] Field of Search ................................... 345/168, 169, 345/163, 156, 167; 248/918; 400/713, 714, 717, 718, 485, 488; 341/22; 361/680, 681

[56] References Cited

U.S. PATENT DOCUMENTS

| | | | |
|---|---|---|---|
| 4,977,397 | 12/1990 | Kuo et al. | 345/173 |
| 5,187,468 | 2/1993 | Garthwaite et al. | 400/717 |
| 5,413,294 | 5/1995 | Greenquist | 248/918 |
| 5,575,578 | 11/1996 | Lakoski et al. | 400/717 |

OTHER PUBLICATIONS

"Briefcase—Portable Textwriter with 100–key Full–size Keyboard" IBM, Technical Disclosure Bulletin, G.G. Pechanek and B.M. Streepey, vol. 27 No. 4A Sep. 1984.

Primary Examiner—Dennis Chow
Attorney, Agent, or Firm—Akin, Gump, Strauss, Hauer & Feld, L.L.P.

[57] ABSTRACT

A mouse pad (10) is disclosed which can be attached conveniently to a portable computer (12). The pad has a lip (30) which fits over the border (18) of the keyboard on a personal computer and a mounting plate (40) having a planar surface (82) which engages the outer surface (24) of the keyboard to secure the pad on the portable computer. A pad (90) can be provided with keys (92).

2 Claims, 4 Drawing Sheets

5,995,082

REMOVABLE PAD FOR PORTABLE COMPUTER

TECHNICAL FIELD OF THE INVENTION

This invention relates to the personal computer industry, and in particular to an accessory pad for use with a portable or notebook computer.

BACKGROUND OF THE INVENTION

Many personal computer operators use a mouse in operating the computer. Typically, the mouse, a small electronic box on rollers, is moved about a hard flat surface known as a pad. While the mouse can be used on certain surfaces, such as table top, with some success, it is more common to have a dedicated pad on which to move the mouse.

With a stationary personal computer, it is usually straightforward to find an area to place the pad and mouse on a semi-permanent basis. However, with a portable or notebook type computer, it is often inconvenient to find a suitable space to put the pad and mouse near the computer. Furthermore, the size of the typical pad makes it difficult to use with the portable computer on the road. Therefore, a need exists to develop a more effective mouse and pad which is more readily adapted for use with a portable computer.

SUMMARY OF THE INVENTION

In accordance with one aspect of the present invention, a pad is provided for attachment to a portable computer, the computer having a keyboard. The keyboard has a plurality of keys with an inside surface adjacent the keys and an outside surface parallel the inside surface. The pad includes a base having a lip engaging the inside surface of the keyboard and structure mounted to the base for engaging the outside surface of the keyboard to clamp the pad to the keyboard between the surfaces. The base can form a pad for use of a mouse or could be used to mount additional keys to input data to the computer.

The structure for mounting the base can include a slidable mounting plate which is guided by a pair of rails on the under surface of the pad. The mounting plate comprises a planar face for engaging the side of the portable computer to capture the side of the computer between the planar face of the mounting plate and the lip which engages the inner surface of the computer keyboard rim. The mounting plate is locked in the desired position by a pair of complementary gear teeth on the under surface of the pad and the mounting plate respectively.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE PREFERRED EMBODIMENT

Figure 1:
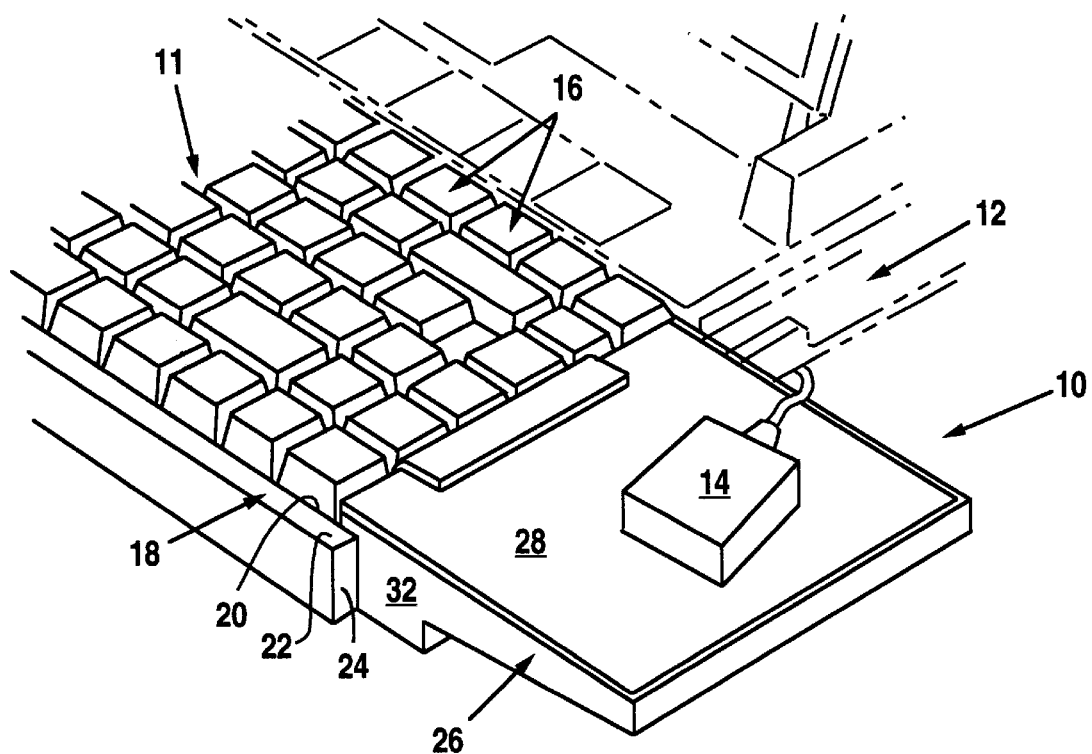
FIG. 1 is a perspective view of a pad forming a first embodiment of the present invention.
Figure 2:
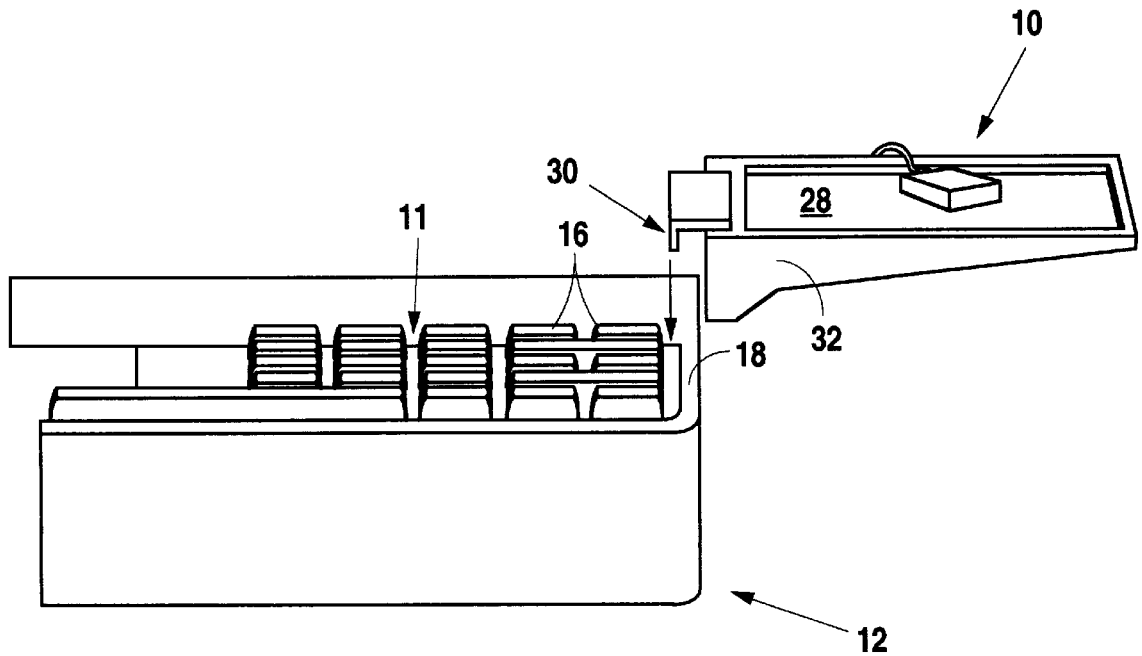
FIG. 2 is a side view showing the pad of the present invention elevated above a portable computer keyboard prior to being secured thereon.

With reference now to the accompanying drawings, wherein like and corresponding parts throughout the several views are identified by identical reference numerals there is shown in FIGS. 1 and 2 a mouse pad 10 forming a first embodiment of the present invention which is mounted to a notebook or portable computer 12 permitting the use of a mouse 14 with the portable computer 12.

As can be seen in FIG. 1, the portable computer 12 has a series of keys 16 built into the keyboard 11 which are surrounded by the rim 18 of the keyboard 11. The rim 18 has a continuous inner surface 20 which faces the keys 16, a top surface 22 and an outside surface 24 which forms the outer periphery of the keyboard 11.

The mouse pad 10 is formed with a base 26 having a flat upper surface 28 forming the operable surface of the pad. The base also has a downwardly turned lip 30, seen best in FIG. 2, with the lip extending downwardly from one edge of the upper surface 28. Reinforcing brackets 32 and 34 extend downwardly from the surface on opposite edges. The lip 30 engages the inner surface 20 of the keyboard rim, with the rim being captured between the opposing faces of the lip 30 and a planar surface of a mounting plate discussed in greater detail below.

Figure 3:
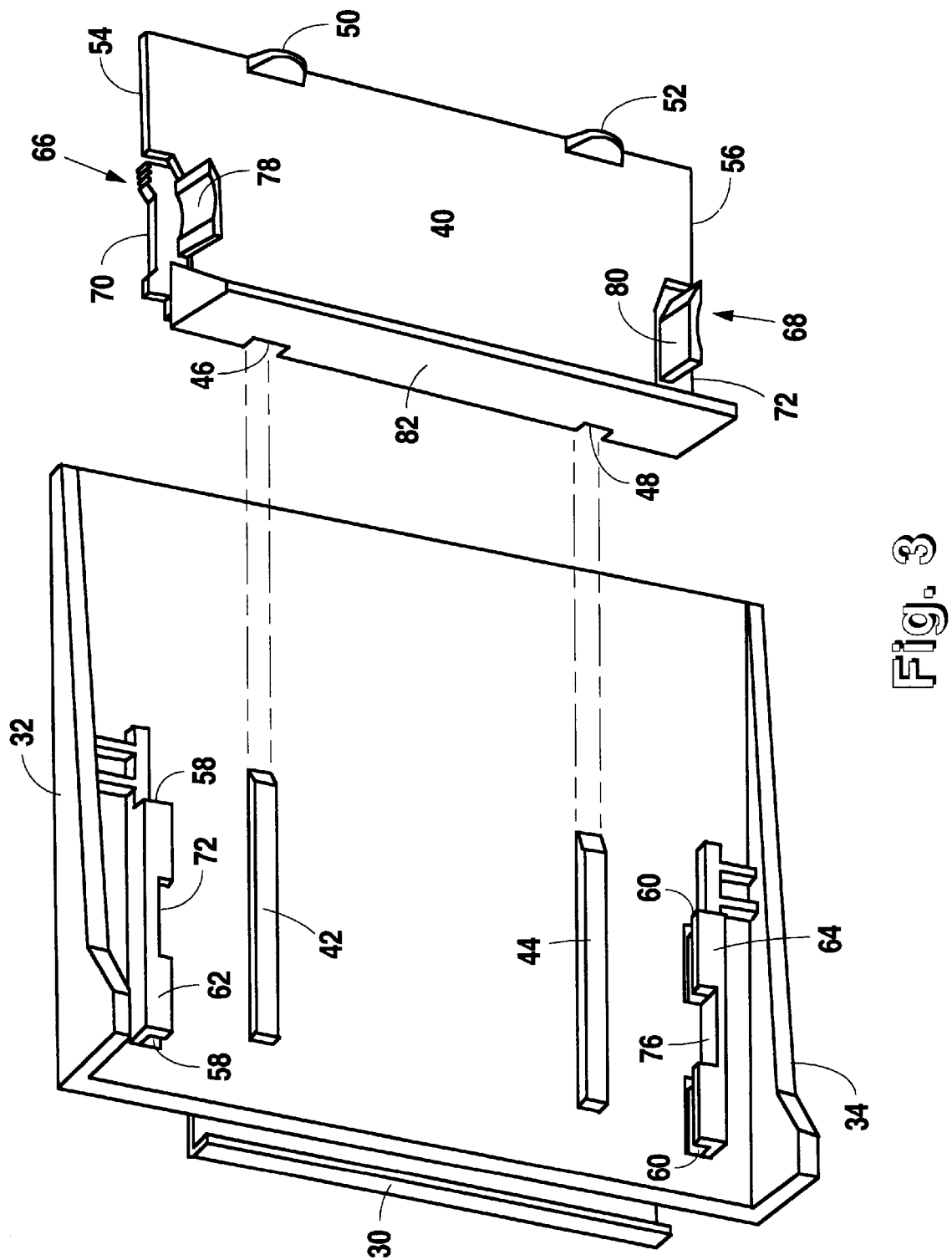
FIG. 3 is a perspective exploded view of the underside of the pad of FIG. 1 showing details relating to the mounting rails and locking gear teeth for securing the mounting plate in an engaged position with the computer keyboard.

FIG. 3 is a perspective view of the underside of the pad showing details for securing a mounting plate 40 thereon. A pair of mounting rails 42 and 44 are received in a pair of grooves 46 and 48 in the mounting plate to guide the mounting plate as it is slidably moved into its secured position on the underside of the pad by the operator exerting a force on the tabs 50 and 52. As the mounting plate 40 slides into place, the edges 54 and 56 of the mounting plate are received in complementary grooves 58 and 60 in guide brackets 62 and 64 on the underside of the pad. A plurality of gear teeth 66 and 68 are formed on spring tabs 70 and 72, respectively. These gear teeth are releasably engaged with complementary gear teeth 74 and 76 on the inner surfaces of the grooves 58 and 60, respectively, as the mounting plate is moved. As the mounting plate 40 is moved toward the lip 30, the gear teeth engage in a ratcheting manner to secure the mounting plate in a plurality of positions on the underside to the pad 10. When the mounting plate 40 is secured, the planar surface 82 will engage the outer surface 24 of the rim 18 of the computer keyboard and the lip 30 will engage the inner surface 20 of the rim to secure the pad to the portable computer to allow use of a computer mouse. A layer of foam rubber 84, shown in FIG. 4, or other suitable material can be attached to the face of the planar surface 82 to stabilize the pad in its secured position on the computer.

Figure 4:
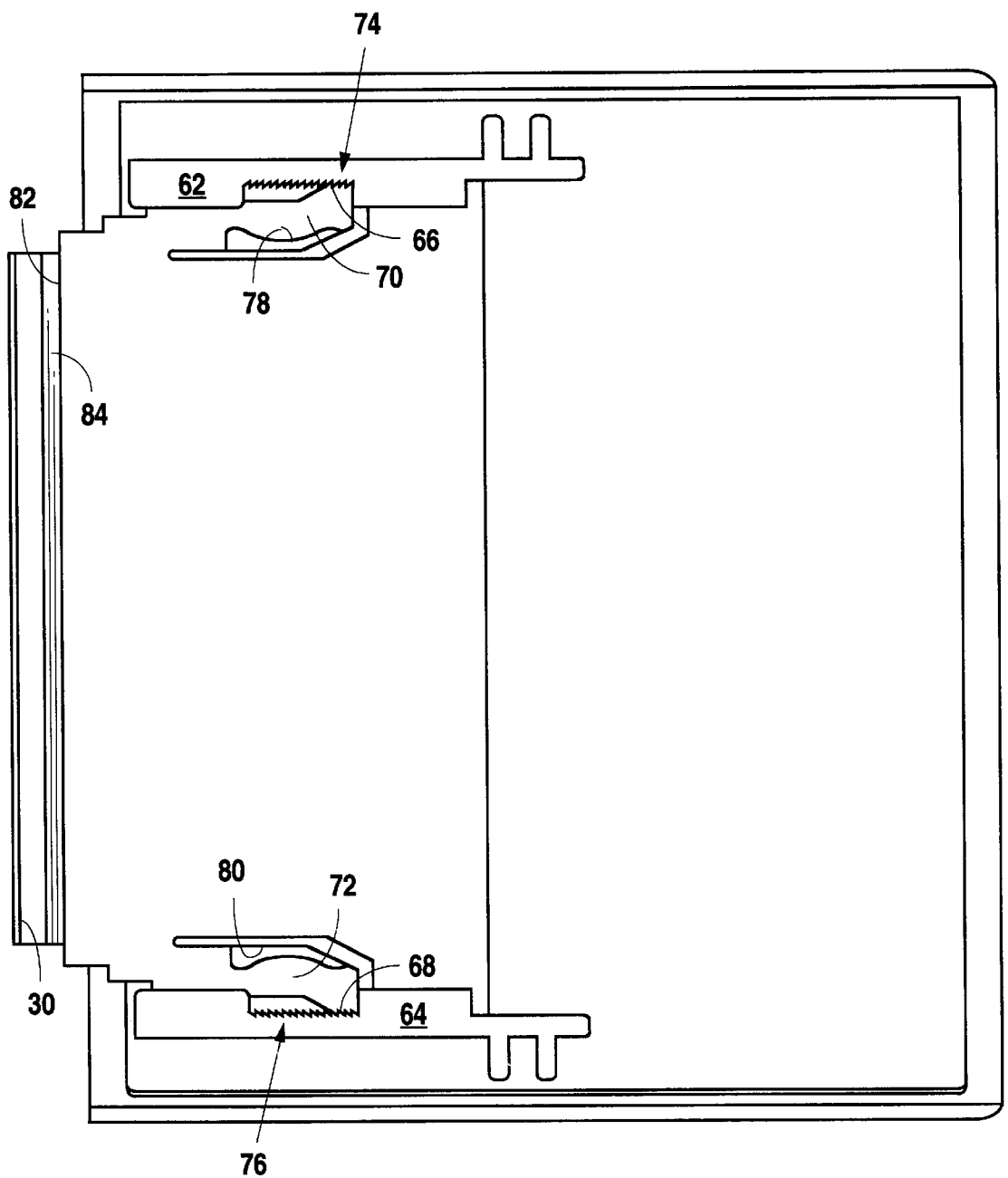
FIG. 4 is a bottom view showing the underside of the pad with the mounting plate secured on the mounting rails and secured in a desired position by the locking teeth.
Figure 5:
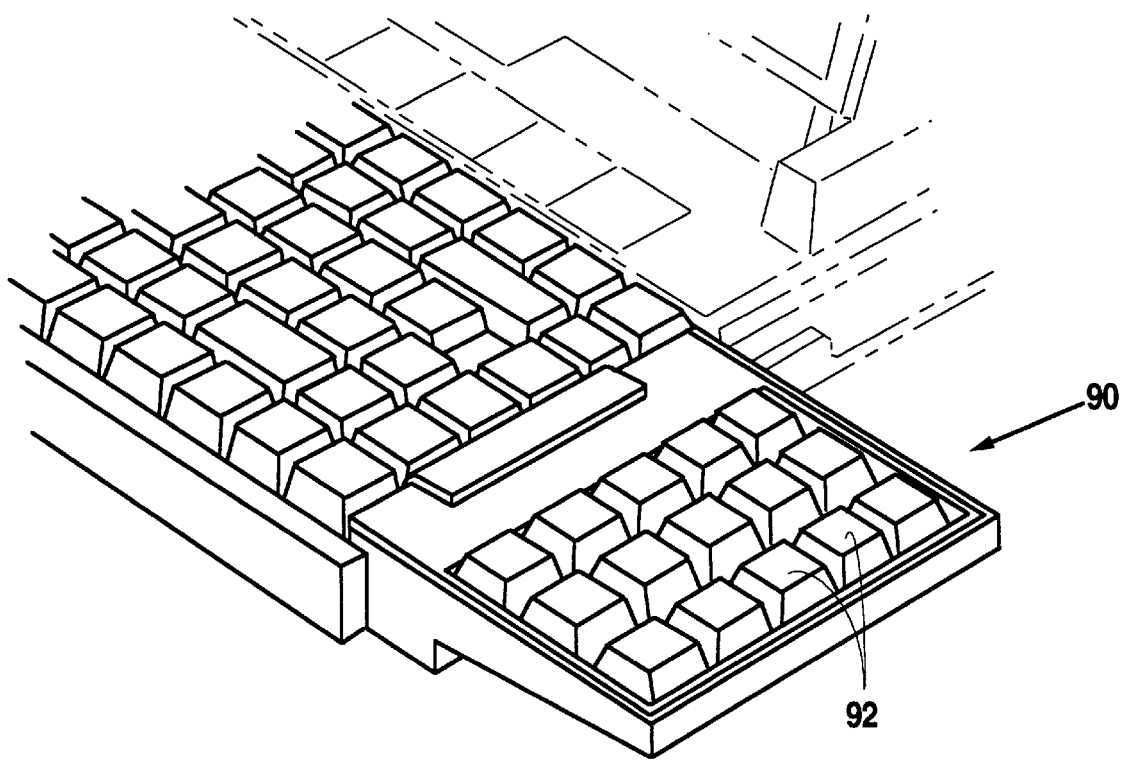
FIG 5 is a perspective view of a pad with keys forming a modification of the pad of FIG. 1.

FIG. 4 shows the mounting plate secured in a locked position in the underside of the pad 10. As can be seen spring tabs 70 and 72 are compressed slightly to cause the teeth 66 and 68 to be biased into engagement with complementary teeth 74 and 76, respectively, on the inner surfaces of the grooves in the mounting brackets 62 and 64. By exerting pressure on the finger tabs 78 and 80 toward the center of the pad, the pressure on the spring tabs 70 and 72 can be counteracted to allow the teeth on the respective surfaces to be disengaged to allow removal of the mounting plate, thereby releasing the pad from the side of the computer.

As illustrated in FIG. 1, mouse pad 10 is intended for use with a mouse 14. However, mouse pad 90, illustrated in FIG.

5, can have essentially the same features as pad 10 described above, but includes additional keys 92 mounted on the base of the pad. The manner of attaching the pad 90 is essentially the same as mounting the pad 10 as described hereinabove.

It also should be understood that pad 10 and pad 90 could be used with the keyboard of a fixed non-portable computer as well. Some operators prefer to place the keyboard in their lap, or on a surface somewhat remote from the computer. It would be convenient to have the pad 10 or pad 90 attached to the keyboard so that the operator can move the keyboard and pad as one unit. Essentially, the design of the keyboard 11 is the same as the keyboard of a regular, non-portable computer, and FIGS. 1 and 2 essentially show how the pads 10 and 90 would be mounted on a conventional keyboard by simply assuming keyboard 11 is the keyboard of a non-portable computer. The description and drawings of how the pad is attached to the keyboard 11 above would apply to attaching the pad to the keyboard of a non-portable computer as well.

Although a single embodiment of the invention has been illustrated in the accompanying drawings, and described in the foregoing detailed description, it will be understood that the invention is not limited to the embodiment disclosed, but is capable of numerous rearrangements, modifications and substitutions of parts and elements without departing from the scope and spirit of the invention.

I claim:

1. A pad for attachment to a computer, the computer having a keyboard, the keyboard having a plurality of keys, an inside surface adjacent the keys and an outside surface parallel the inside surface, comprising:

a base having a lip engaging the inside surface of an outer rim of said keyboard;

means mounted to the base for engaging the outside surface of the rim of said keyboard to clamp the pad to said keyboard between the surfaces, wherein the means for engaging the outside surface of said keyboard includes a mounting plate having a planar surface for engaging said outside surface of said keyboard, said mounting plate being slidable within and carried by a pair of rails on said mounting plate and being lockable in a desired position by a pair of complementary gear teeth on the undersurface of said pad and the edge of said mounting plate, respectively; and a surface on said pad for operating a computer mouse.

2. A pad for attachment to a computer, the computer having a keyboard, the keyboard having a plurality of keys, an inside surface adjacent the keys and an outside surface parallel the inside surface, comprising:

a base having a lip engaging the inside surface of an outer rim of said keyboard;

means mounted to the base for engaging the outside surface of the rim of said keyboard to clamp the pad to said keyboard between the surfaces, wherein the means for engaging the outside surface of said keyboard includes a mounting plate having a planar surface for engaging said outside surface of said keyboard, said mounting plate being slidable within and carried by a pair of rails on said mounting plate and being lockable in a desire position by a pair of complementary gear teeth on the undersurface of said pad and the edge of said mounting plate respectively; and wherein said base mounts a plurality of additional keys for entry of data into the computer.

* * * * *